United States Patent
Kasamatsu

[11] Patent Number: 5,805,970
[45] Date of Patent: Sep. 8, 1998

[54] DOCUMENT SIZE DETECTING DEVICE USING A PLURALITY OF THRESHOLDS

[75] Inventor: Toru Kasamatsu, Toyokawa, Japan

[73] Assignee: Minolta Co., Ltd., Osaka, Japan

[21] Appl. No.: 689,770

[22] Filed: Aug. 12, 1996

Related U.S. Application Data

[63] Continuation of Ser. No. 420,440, Apr. 10, 1995, abandoned, which is a continuation of Ser. No. 102,628, Aug. 5, 1993, abandoned.

[30] Foreign Application Priority Data

Aug. 7, 1992 [JP] Japan .................................... 4-211860

[51] Int. Cl.⁶ .............................................. G03G 15/00
[52] U.S. Cl. ............................................ 399/376; 358/449
[58] Field of Search .................................... 355/208, 230, 355/231, 311, 75; 358/449; 250/560; 399/376

[56] References Cited

U.S. PATENT DOCUMENTS

| | | | |
|---|---|---|---|
| 4,630,127 | 12/1986 | Fuwa | 355/311 X |
| 4,713,550 | 12/1987 | Anzai et al. | 355/204 X |
| 5,016,049 | 5/1991 | Onishi et al. | 355/203 |
| 5,041,919 | 8/1991 | Yamamoto et al. | 358/449 |
| 5,122,833 | 6/1992 | Sato | 355/203 |
| 5,198,853 | 3/1993 | Ichihara et al. | 355/244 |
| 5,225,688 | 7/1993 | Endo | 355/311 X |

FOREIGN PATENT DOCUMENTS

| | | |
|---|---|---|
| 56-78849 | 6/1981 | Japan . |
| 62-0220946 | 9/1987 | Japan . |
| 2-277038 | 11/1990 | Japan . |

*Primary Examiner*—Robert Beatty
*Attorney, Agent, or Firm*—Sidley & Austin

[57] ABSTRACT

A document size detecting device employed in an image forming apparatus for accurately detecting a document size by using two threshold values. The detecting device uses one threshold for a monochrome document, and the other for a color document, or it uses both the thresholds alternately depending on the number of scanning lines completed by an image sensor.

9 Claims, 18 Drawing Sheets

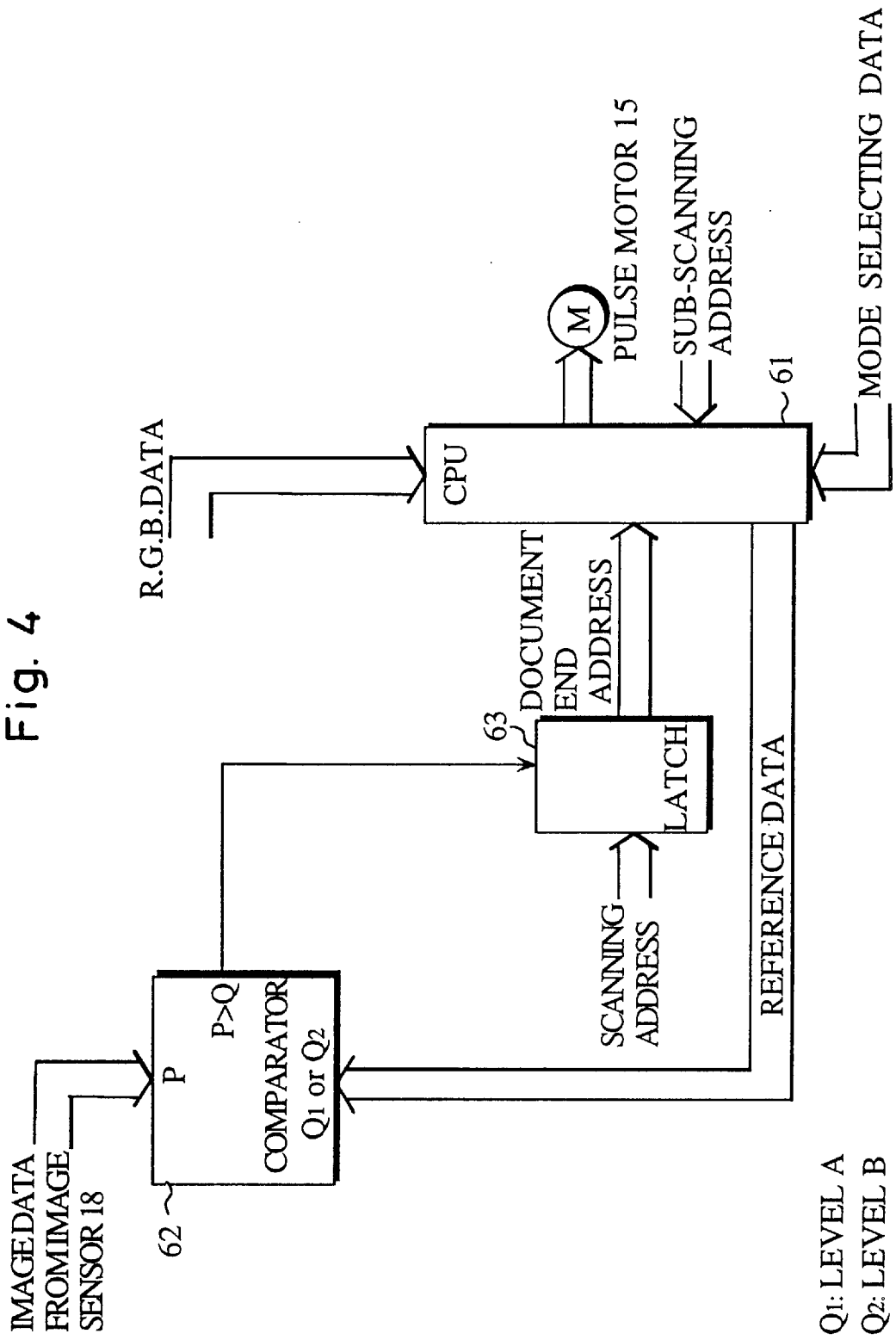

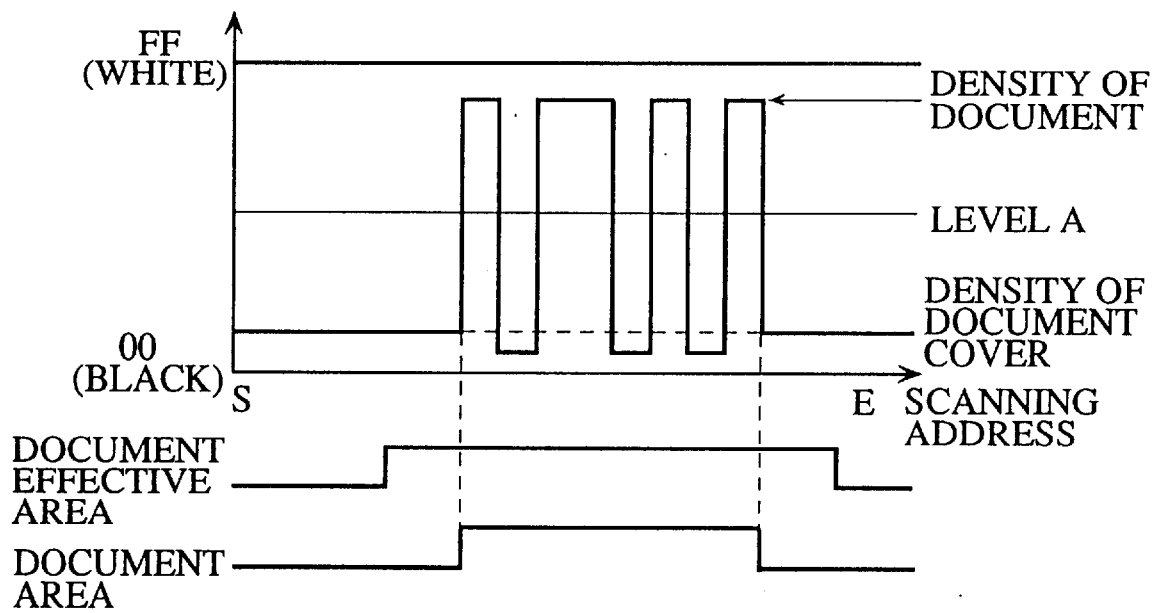
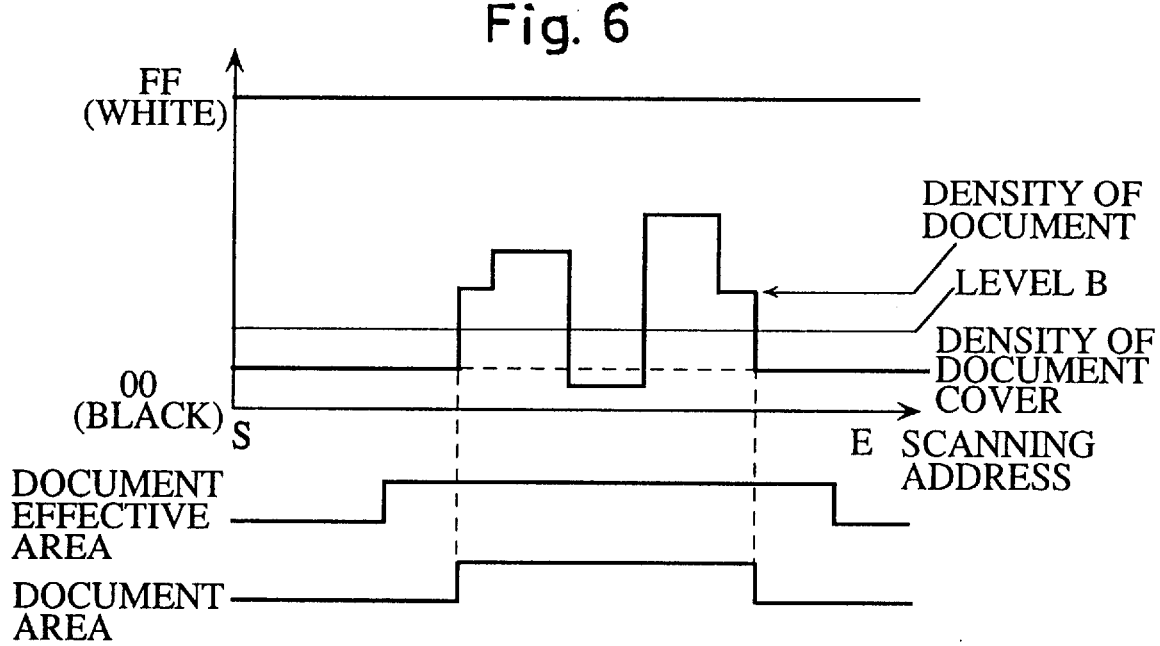

Fig. 15-A
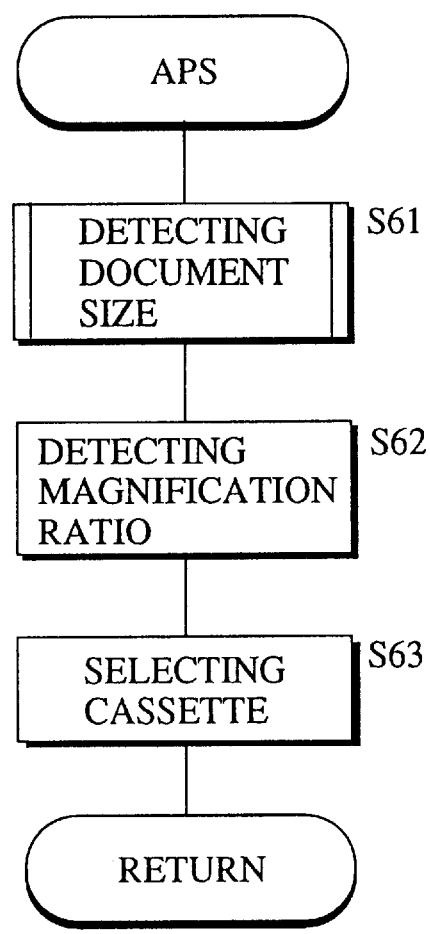
Fig. 15-B
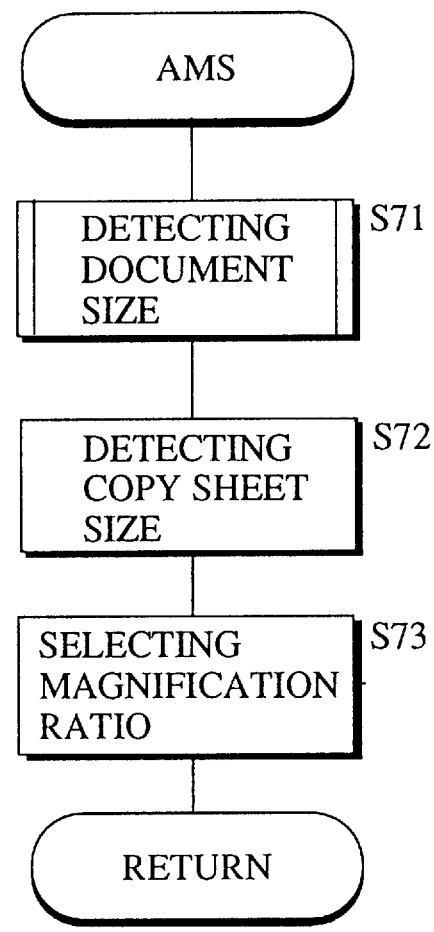

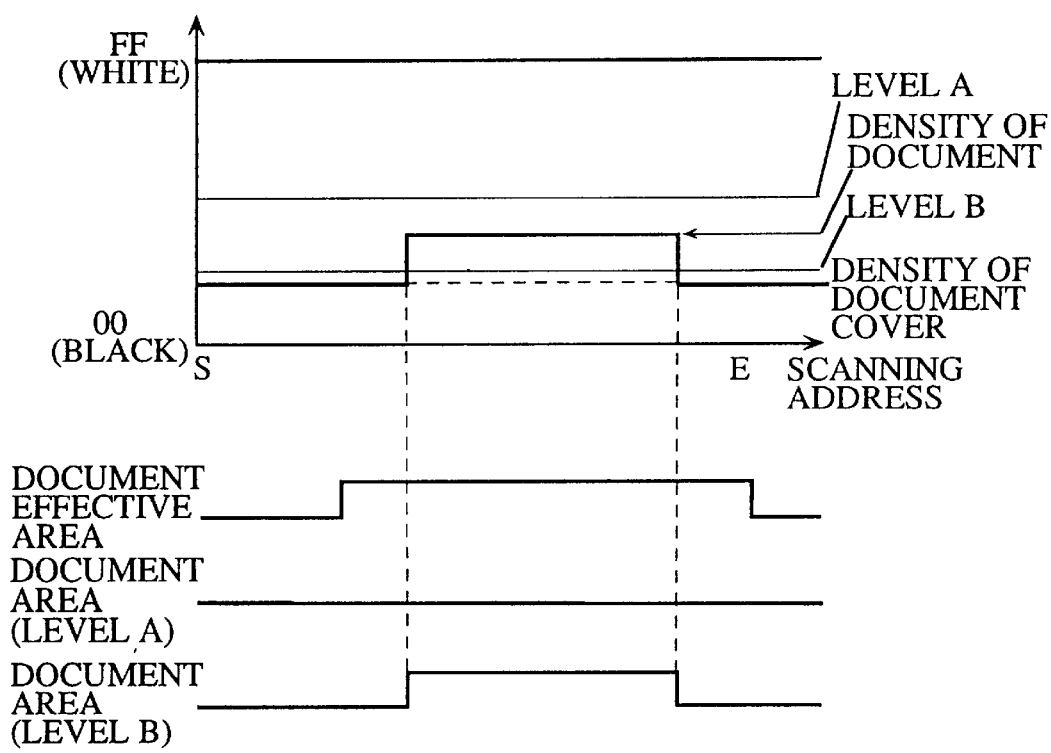

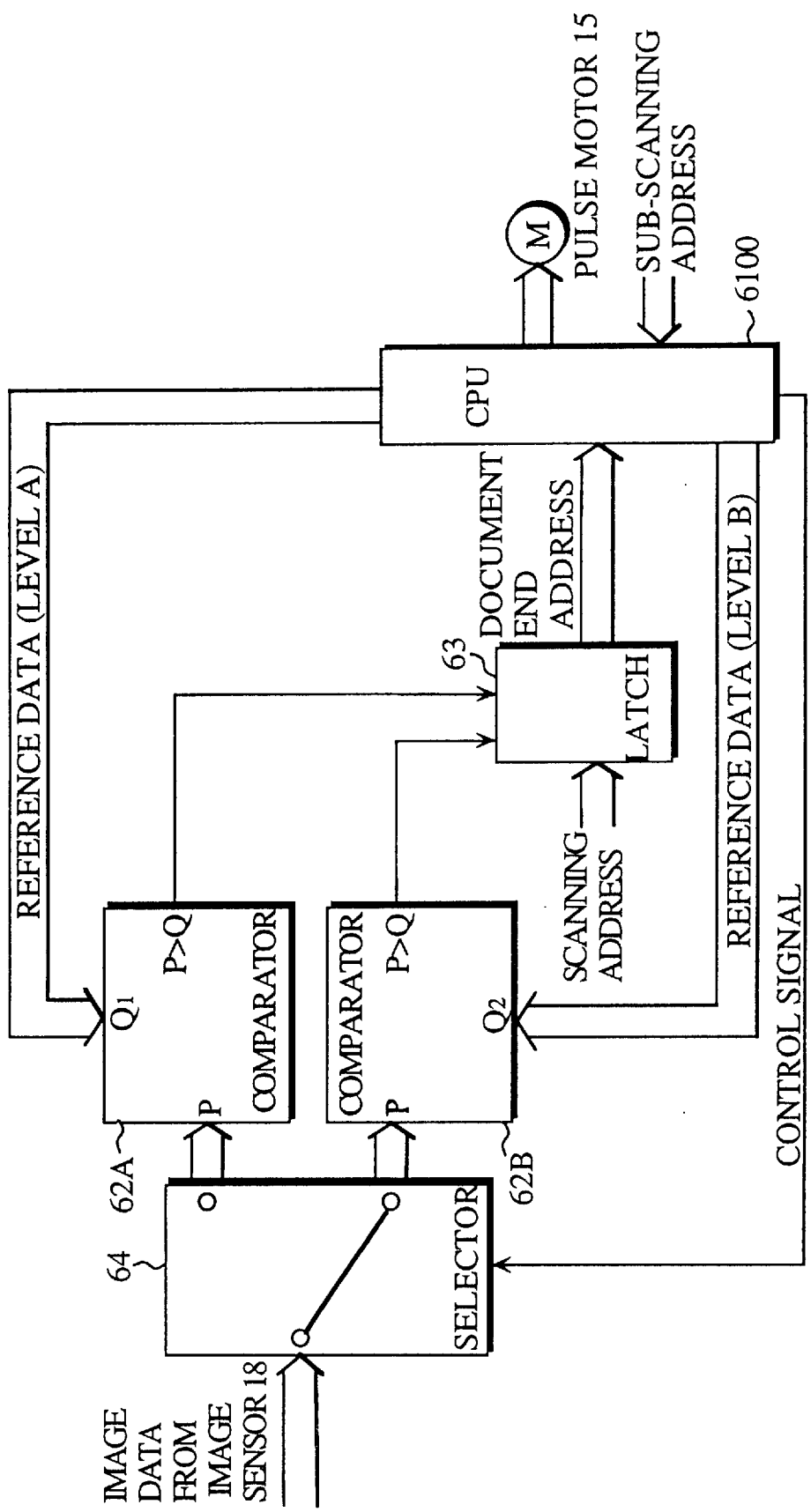

DOCUMENT SIZE DETECTING DEVICE USING A PLURALITY OF THRESHOLDS

This application is a continuation of application Ser. No. 08/420,440, filed Apr. 10, 1995, now abandoned, which is a continuation of application Ser. No. 08/102,628, filed Aug. 5, 1993, now abandoned.

BACKGROUND OF THE INVENTION

1. Field of the Invention

The present invention relates to a document size detecting device employed in an image forming apparatus for detecting a document size based on an amount of light reflected therefrom through scanning.

2. Description of Related Art

With a conventional document size detecting device, a document is placed on a glass document table and covered entirely with a document cover to be scanned from a light source underneath to measure the amount of reflected light. Since the lower surface of the cover is colored and/or matted, less amount of light is reflected therefrom than from a white background of a monochrome or a slightly colored document area, making it possible to distinguish the document area from the lower surface area. Parallel with this distinction, a document size is determined by comparing the measured amount of the reflected light from the document area with a predetermined threshold set at a relatively high level while maintaining a sufficient margin from both the lowest and highest levels.

However, when the background of the document area and the lower surface area are alike in color, there will be small difference in the amount of the reflected light from each area. Thus, the document size detection with the threshold set at a relatively high level turns out to be inaccurate or even impossible in some cases. Although the threshold could be lowered to an adequate level, it diminishes the margin between the threshold and the lowest level, and thus would cause to blur the distinction of the two areas in case of detecting the monochrome document, which results in erroneous size detection.

SUMMARY OF THE INVENTION

Accordingly, the present invention has an object to provide a document size detecting device that can detect the size of the document accurately regardless of the color thereof.

The above object is fulfilled by a document size detecting device which uses plural thresholds. The document size detecting device uses one threshold set at a higher level so as to have a sufficient margin for a monochrome document, and the other set at a lower level for a color document, or uses both the thresholds either simultaneously or alternately irrespective to the color of the document.

In the former, the size of the monochrome document can be detected accurately by using the threshold having such a sufficient margin, while the size of the color document can be detected by using the other threshold set at such a lower level even if the reflected light from the document is weak.

In the latter, even when the document size can not be detected with one of the thresholds, it can be detected with the other threshold, thereby making the accurate document size detection possible regardless of the background color.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 4 is a block diagram of CPU 61 and the associated devices;

FIG. 5 is a timing chart for detecting the size of the monochrome document;

FIG. 6 is a timing chart for detecting the size of the color document;

FIG. 15-A is a flowchart detailing the APS routine;

FIG. 15-B is a flowchart detailing the AMS routine;

FIG. 18 is a timing chart for detecting the size of the color document in the second embodiment;

FIG. 19 is a table explaining the correlation between the detected document sizes and determined document sizes;

FIG. 20 is a block diagram of CPU 6100 and the associated devices; and

DESCRIPTION OF THE PREFERRED EMBODIMENTS (First Embodiment)

Figure 1:
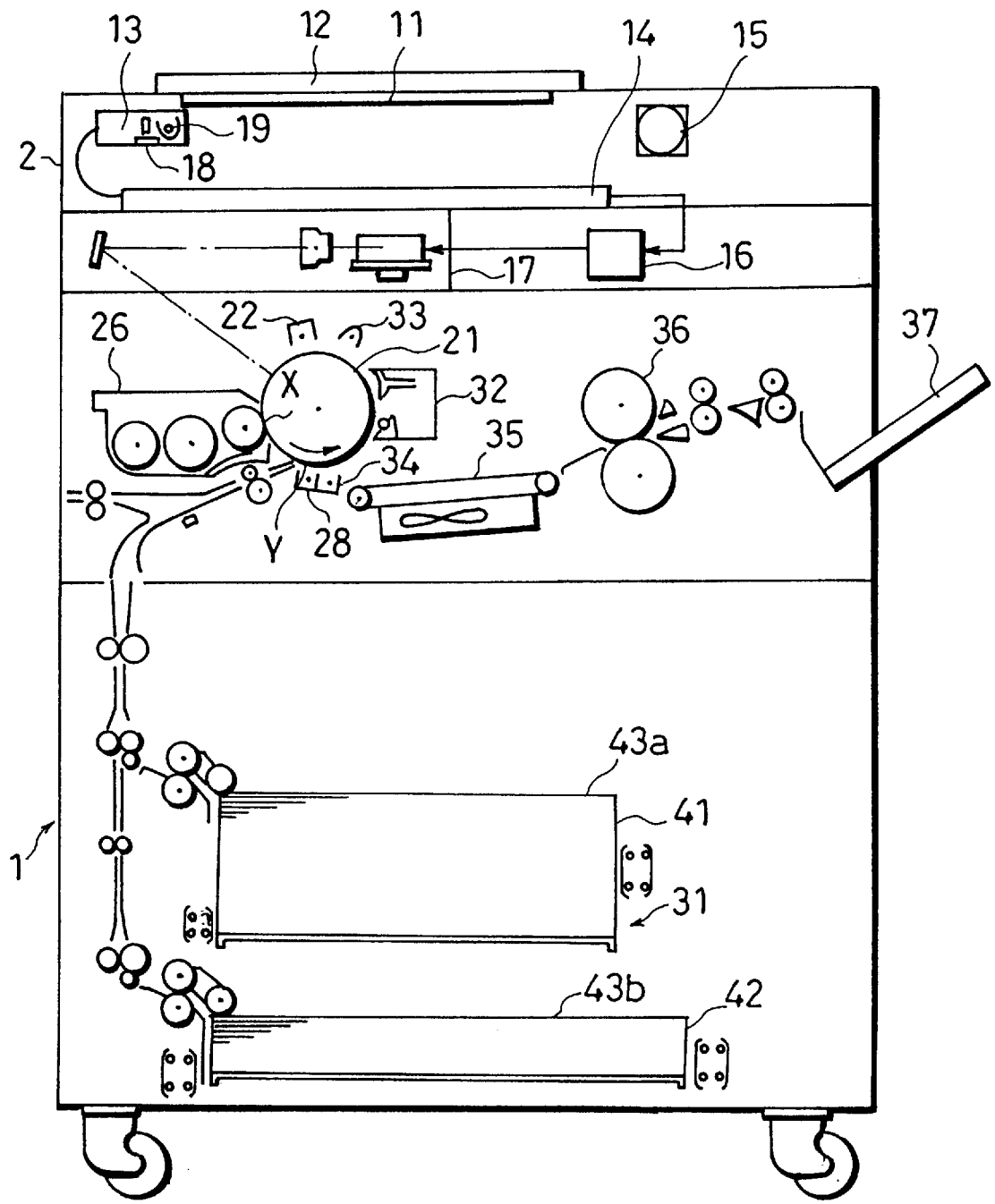
FIG. 1 is a sectional view of a copying machine employing the document size detecting device of the present invention.

Depicted in FIG. 1 is an example of a copying machine employing the document size detecting device of the present invention, which mainly consists of a printing unit 1 and an image reading unit 2.

Figure 2:
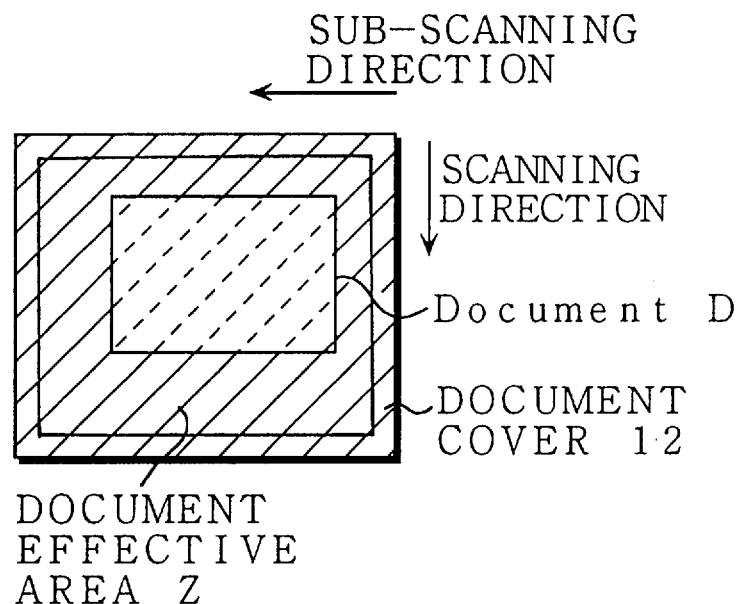
FIG. 2 is a view showing the correlation among the document cover 12, document effective area 12, and document D.
Figure 3:
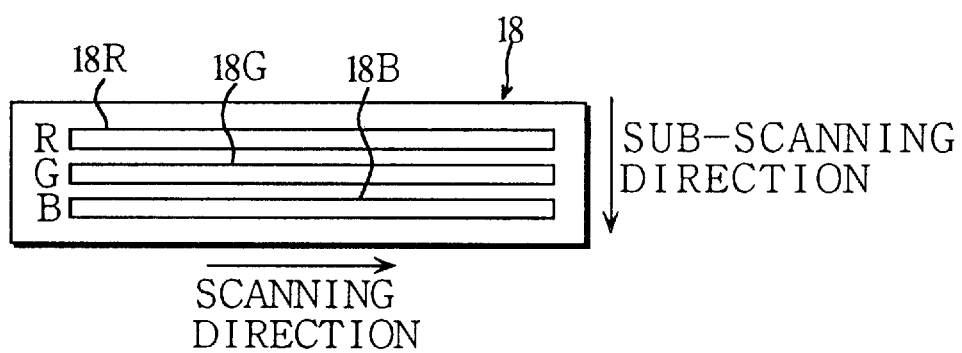
FIG. 3 is a plane view of the image sensor 18.

The image reading unit 2 includes a document table 11 made of a transparent material such as a glass plate, a document cover 12 for covering an entire document, a scanner 13 for scanning the document table 11 from underneath, an image processing unit 14 for generating digital image data upon receipt of the output from the scanner 13, and a pulse motor 15 for driving the scanner 13 to reciprocate in a sub-scanning direction—from left to right and vice versa. The document cover 12, as is shown in FIG. 2, is designed to cover an entire document effective area Z, where a document D is placed to be read by the scanner 13. In addition, the lower surface thereof is colored and/or matted to have less reflectance than the document D. The scanner 13 includes a light source 19 for lighting the document on the document table 11 in addition to an image sensor 18. The image sensor 18 reads an image on the document while serving as a photosensor for the reflected light from the document D and the document cover 12. More precisely, the image sensor 18 consists of three CCD (Charge-Coupled Devices) arrays 18R, 18G, and 18B which are extended in a scanning direction and are provided in parallel on a board with spaces corresponding to 12 pixels (12 lines) between each other as is shown in FIG. 3. Each array has respective color spectral filters: 18R has a spectral filter for red, 18G for green, and 18B for blue. As well, each array has a number of CCD elements comparable to 5,000 pixels, and for example, a resolution of 16 lines/mm for an A-3 size (420×297 mm) sheet. Further, each array outputs a photovoltaic signal at a regular interval, which is adjusted in accordance with the sub-scanning speed relative to magnification ratio (enlargement/contraction ratio); the interval in case of the same magnification is comparable to 12 lines, for example.

On the other hand, the printing unit 1 includes a print head control unit 16 for converting the image data from the image processing unit 14 into an electric signal, a photosensitive drum 21 charged by a charger 22 as it rotates counter-clockwise, a laser device 17 for forming a latent image thereon by removing the charge through a laser beam radiation with the electric signal from the print head control unit 16, a developing device 26 for developing the latent image into a toner image at a developing station marked as 'X' with a supply of toner, a transfer charger 28 for transferring the toner image onto a copy sheet fed from a feeding device 31 at a transfer station marked as 'Y', a cleaning device 32 for scraping off residual toner powder on the photosensitive drum 21, an eraser lamp 33 for erasing a remaining charge thereon, a separating charger 34 for separating the copy sheet therefrom after the image transfer, a transport belt 35 for transporting the copy sheet to a fixing device 36 where the transferred image is fixed on the copy sheet, and a catch tray 37 onto which the copy sheet is discharged by means of a pair of discharge rollers. The feeding device 31 includes cassettes 41 and 42, each containing copy sheets 43a and 43b in respective sizes.

It is CPU (Central Process Unit) 61 that controls the above copying machine and makes the accurate document size detection possible. As is depicted in FIG. 4, CPU 61 is installed together with a comparator 62, and a latch circuit 63 in the copying machine. CPU 61 is designed to selectively output two reference data: reference data $Q_1$ for monochrome documents and reference data $Q_2$ for color documents. The comparator 62 is designed to receive image data P indicating brightness of each pixel read by the image sensor 18, and the reference data $Q_1$ or $Q_2$ for comparison. The comparator 62 outputs a high-level P>Q signal when the image data P is larger than the reference data $Q_1$ or $Q_2$. The latch circuit 63 is designed to latch a scanning address indicating the location of each pixel in the scanning direction only when P>Q raises to a high-level and drops to a low-level again during one scanning period, which is transmitted to CPU 61. Given that these addresses respectively correspond to the top end and bottom end addresses of the document D in the scanning direction, the document D area in the same direction can be distinguished from the lower surface area.

Further, the document D area in the sub-scanning direction can be distinguished from the lower surface area by repeating the scanning operation in the scanning direction while the scanner 13 is moved in the sub-scanning direction. Namely, the bottom end address in the sub-scanning direction can be decided from the addresses finally latched during the movement of the scanner 13 in the sub-scanning direction.

A timing chart for detecting the size of a monochrome document is shown in FIG. 5. In the drawing, FF denotes the highest level expressed in hexadecimal, or 256th level. The image data shows the highest level in the white background portion, and the lowest level in the black image portion, whereas the lower surface area shows a level slightly higher than the lowest level and much lower than the highest level. Therefore, in this case, the reference data $Q_1$ having a relatively high level (level A) is provided to the comparator 62 either automatically or manually. The level of the reference data $Q_1$ is found by averaging the highest level of the white background portion and the intermediate level of the lower surface area. Given that the reference data $Q_1$ has a sufficient margin from both the highest and lowest levels, there is substantially no erroneous document size detection in the monochrome documents.

In contrast, FIG. 6 shows a timing chart for detecting the size of a color document. The image data shows the highest level in the white image portion, and the lowest level in the black image portion, whereas the background portion of the document shows a lower level than the highest level and higher level than the lower surface area. Thus, the reference data $Q_2$ having a lower level(level B) than the reference data $Q_1$ is provided to the comparator 62 either automatically or manually. Given that the level of the reference data $Q_2$ is sufficiently lowered, the size of the color document can be accurately detected even if there is a slight difference in the amount of the reflected light between the document area and the lower surface area.

Further, the operation of the copying machine in more practical manner is explained.

Figure 7:
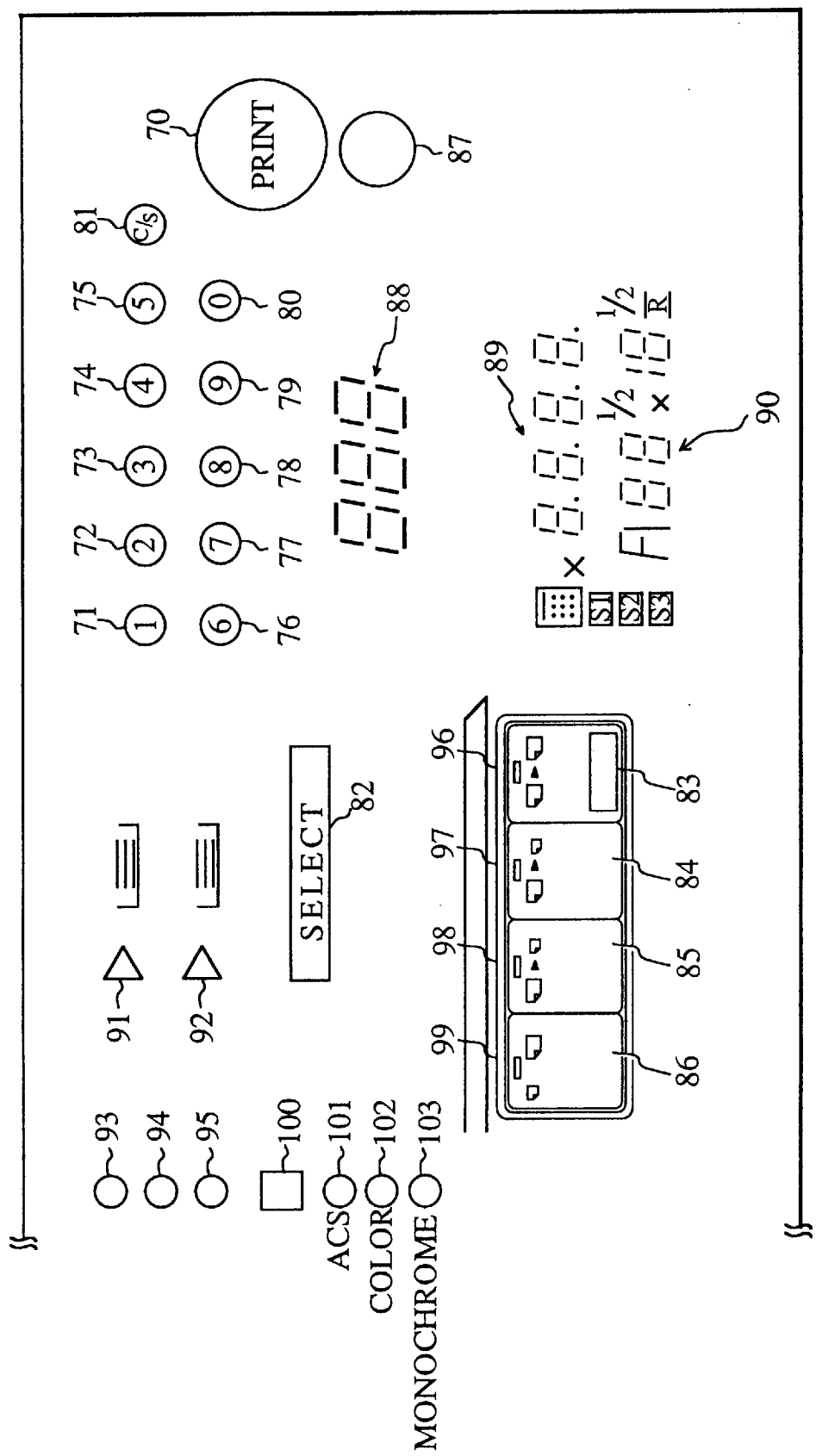
FIG. 7 is a view depicting the control panel of the copying machine.

To begin with, copying conditions such as the number of copies, a copy sheet size, and the magnification ratio must be selected either manually or automatically. In the former case, the conditions are selected with a control panel and displayed thereon, and in the latter case, the automatically selected conditions are displayed on the control panel. An example of the control panel is illustrated in FIG. 7. It consists of operation keys, display segments, and instruments having both functions: a print key 70 as a start key, and 10 keys 71–80 to set the number of copies, a clear/stop key 81 for stopping a multi-copying and clearing the set number, a copy sheet selecting key 82 for selecting the cassette 41 or cassette 42, magnification ratio selecting keys 83–86 (the key 83 for the same magnification, the keys 84 and 85 for enlargement, and the key 86 for reduction), an all-reset key 87 for initializing all the modes set forth below, and a manual key 95 for cancelling all the automatic selecting modes to manually select a desired copy sheet size or magnification ratio; a 3-digit display segment 88 for displaying the number of copies, a display segment 89 for displaying the magnification ratio, a display segment 90 for displaying the selected copy sheet size, LED (Light Emitting Diode) 91 for indicating that the higher cassette 41 is selected, LED 92 for indicating that the lower cassette 42 is selected, LEDs 96–99 for indicating the magnification ratio selected by the select keys 83–86, and LED 100 for indicating non-detectable cases. It should be noted that the copying machine can operate by automatically setting itself in APS (Automatic Paper Selecting) mode where an adequate copy sheet to the determined document size and the selected magnification ratio is selected automatically, AMS (Automatic Magnification Selecting) mode where an adequate magnification ratio to the determined document size and the selected copy sheet size is selected automatically, or ACS (Automatic Color Selecting) mode where whether the document is monochrome or not is judged automatically. For this reason, the control panel also includes LED 93 for displaying the selected copy sheet size in APS mode, LED 94 for displaying the selected magnification ratio in AMS mode, LED 101 for indicating ACS mode is selected. It additionally includes LED 102 for indicating that a color document is to be copied, and LED 103 for indicating that a monochrome document is to be copied; for this purpose, R.G.B. data of one image are stored and compared with a color-distinction map to specify the color of the document.

Figure 8:
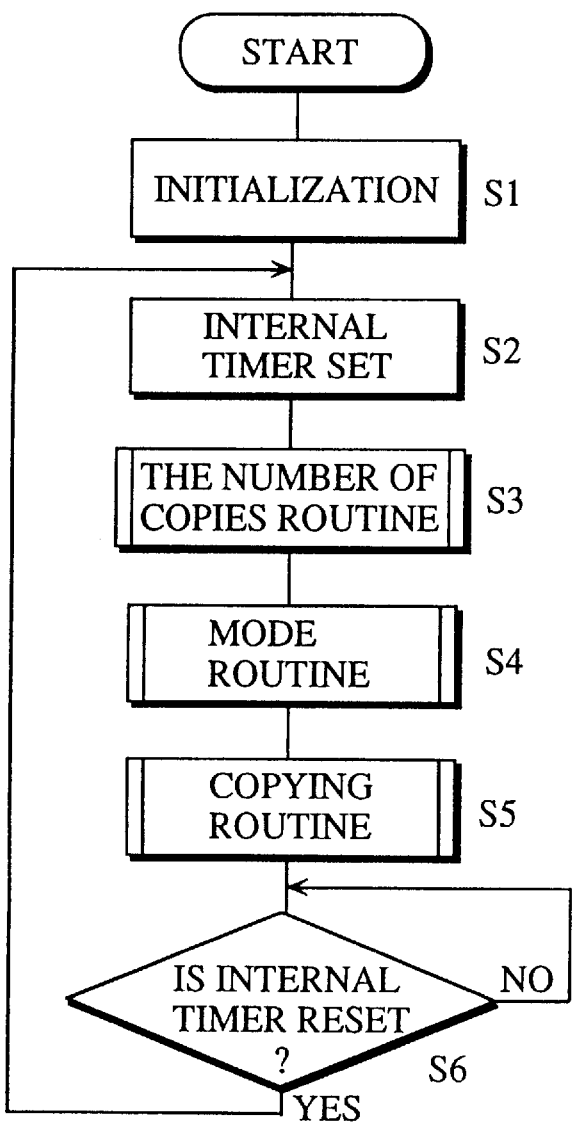
FIG. 8 is a flowchart detailing the operation of CPU 61.

Under these conditions, CPU 61 operates as is detailed in a flowchart in FIG. 8. In Step 1, the copying machine is initialized by clearing the data in RAM (Random Access Memory) and the concerned counters, and an internal timer for measuring the time of each operation is set in Step 2. Subsequently, the number of copies is set in Step 3, thence one of APS, AMS, and manual modes is selected based on the other copying conditions and an appropriate process is carried out in Step 4, whose detail will be described later. Accordingly, the document is copied in accordance with the conditions in Step 5 and whether the internal timer is reset or not is detected in Step 6 to set the internal timer again in Step 2 for the next operation cycle.

Figure 9:
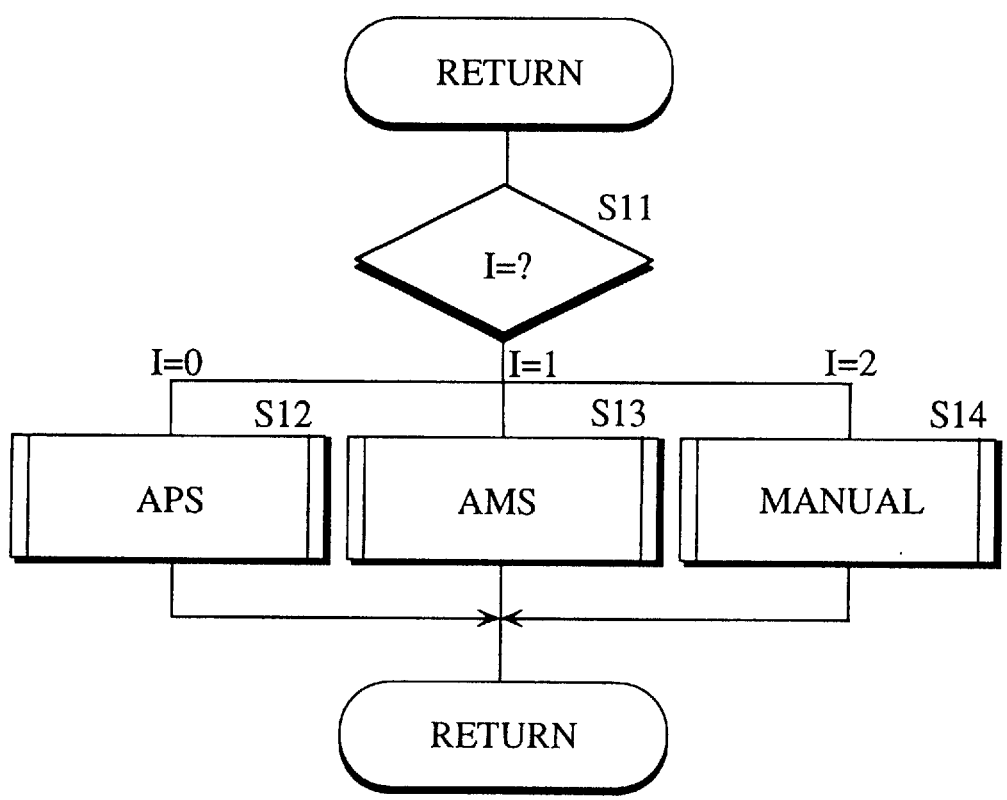
FIG. 9 is a flowchart detailing the sub-routine of Step 4 in FIG. 8.

A flowchart in FIG. 9 details how one of the modes are selected in Step 4; the copying machine is designed to select one of the modes based on the current conditions and to have a variable I which varies in accordance with the selected mode: the variable I has a value 0 for APS mode, and 1 for AMS mode, and 2 for manual mode. Thus, the number of the variable I is detected in Step 11, and once it is detected, the appropriate process is carried out independently in Steps 12, 13 or 14, and it returns to the main routine.

Figure 10:
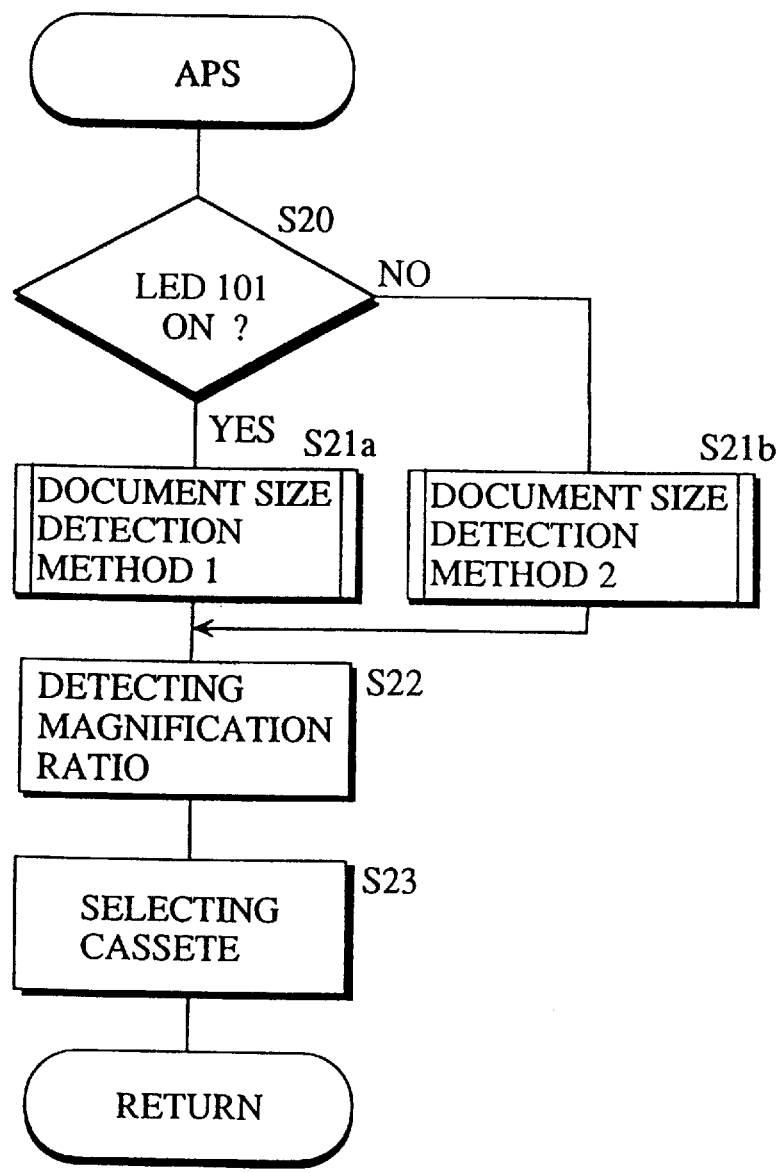
FIG. 10 is a flowchart detailing the APS routine.

A flowchart in FIG. 10 further details the process in case that APS mode is selected. To begin with, whether LED 101 is turned on or not is detected in Step 20. If yes, the size of the document is detected by the first method in Step 21a; otherwise the size of the document is detected by the second method in Step 21b, which will be explained later. Once the document size is detected, the selected magnification ratio is detected in Step 22. Accordingly, whichever of the cassettes 41 and 42 containing the adequate size of copying sheets is selected as a result of the detection in Step 23.

Figure 11:
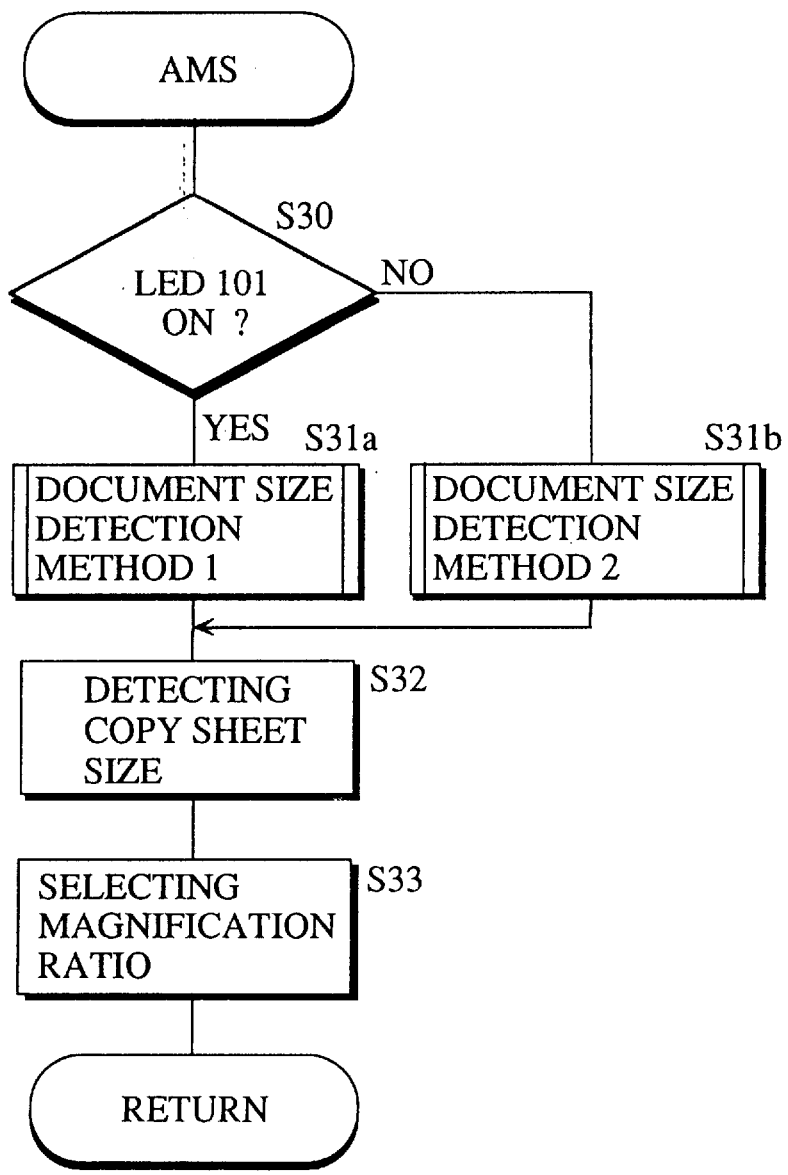
FIG. 11 is a flowchart detailing the AMS routine.

On the other hand, a flowchart in FIG. 11 details the process in case that AMS mode is selected. To begin with, whether LED 101 is turned on or not is detected in Step 30. If yes, as is in the APS mode, the size of the document is detected by the first method in Step 31a; otherwise the size of the document is detected by the second method in Step 31b, which will be explained later. Once the document size is detected, the selected copy sheet size is detected in Step 32. Accordingly, an adequate magnification ratio is selected as the result of the detection in Step 33.

Figure 12:
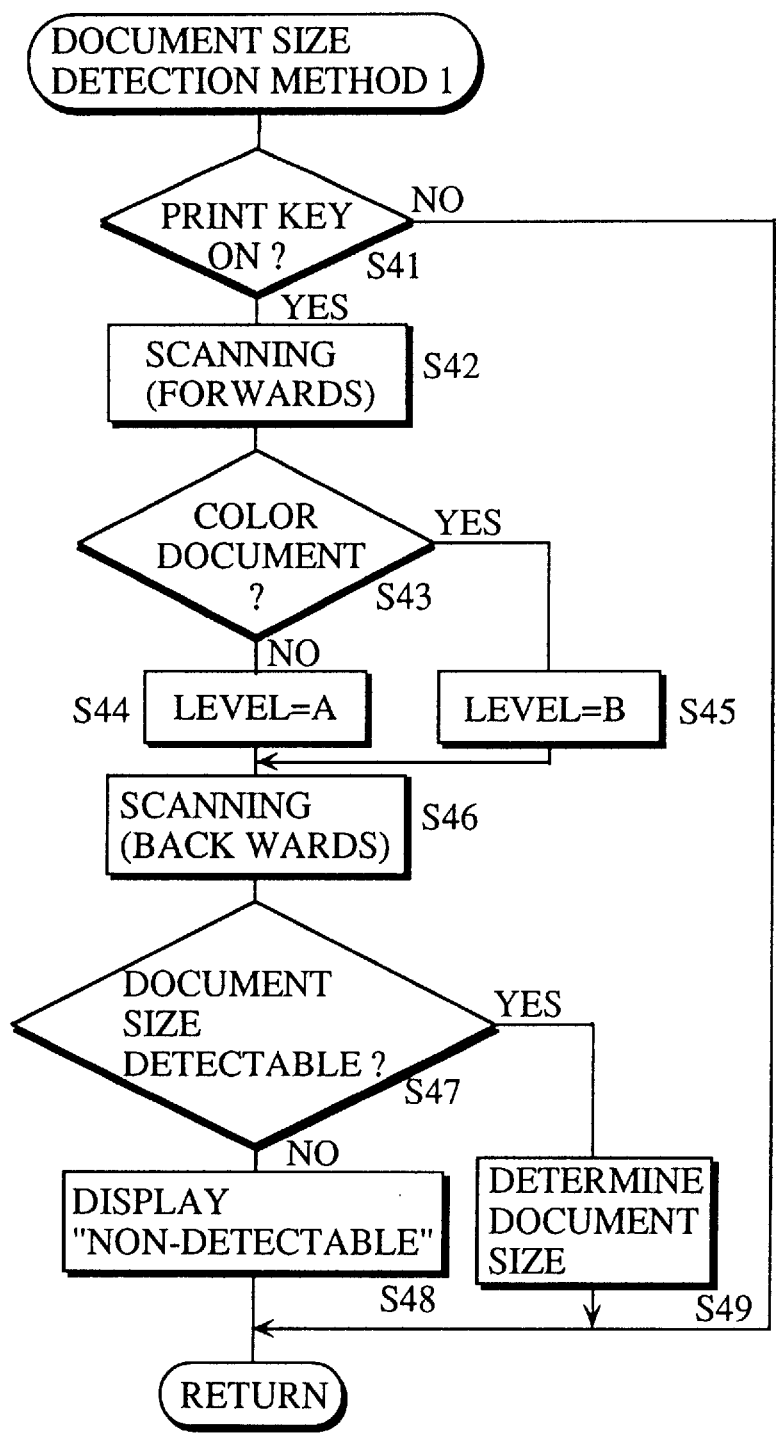
FIG. 12 is a flowchart detailing the first detecting method.
Figure 13:
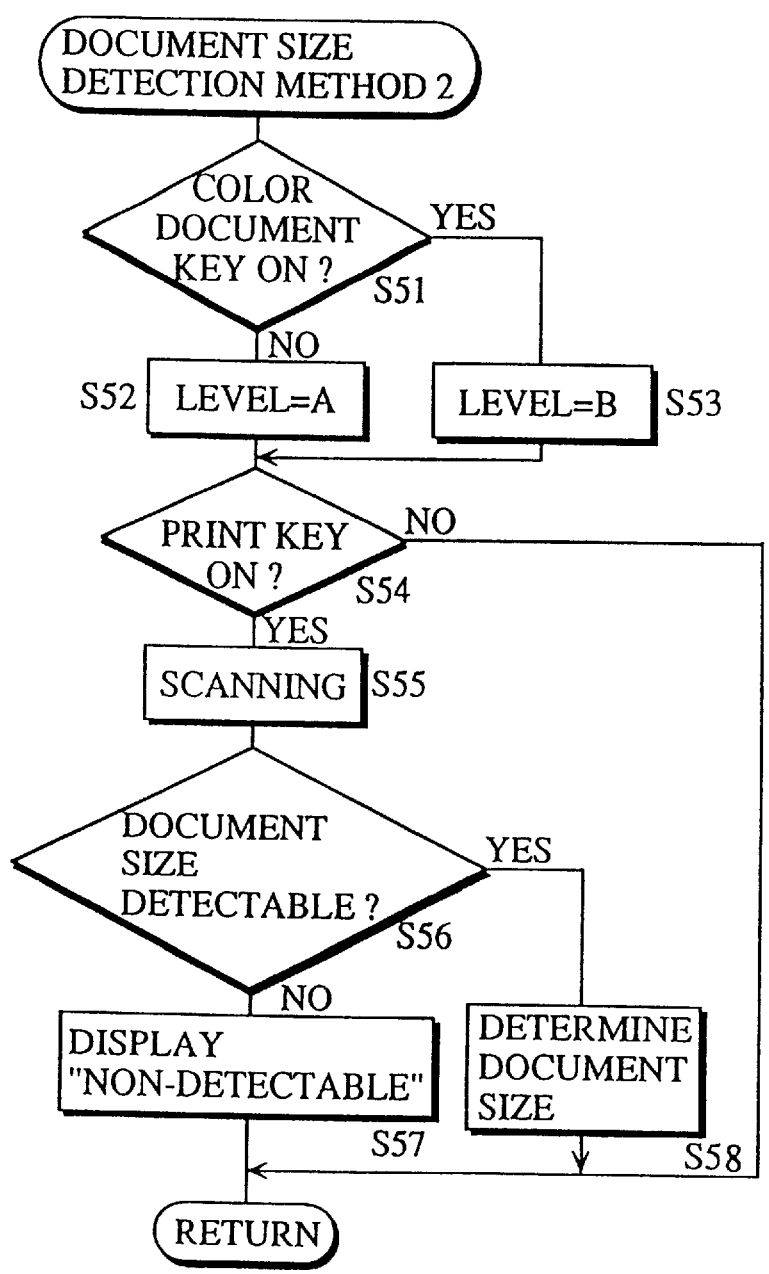
FIG. 13 is a flowchart detailing the second detecting method.

The first and second document size detection methods, which are deemed to be the gist of the present invention, are explained by referring to flowcharts in FIGS. 12 and 13, respectively.

In the first method, the appropriate reference data is selected after the automatic detection of the background color of the document through scanning. Thus, whether the print key 70 is turned on or not is detected in Step 41, and if not, it returns to the sub-routine of either APS mode or AMS mode; otherwise, the document on the document table 11 is scanned by moving the scanner 13 forwards in Step 42. Subsequently, whether the document is monochrome or not is detected in Step 43; when it is monochrome, the reference data $Q_1$ at the level A is provided to the comparator 62 in Step 44, and when it is color, the reference data $Q_2$ at the level B is provided in Step 45; the latter is lower than the former. Then, the edge (all four sides) of the document is detected by moving the scanner 13 backwards in Step 46 followed by Step 47, wherein whether the size of the document is detectable or not is detected in Step 47—whether or not the edge thereof is within the predetermined document effective area and is of a predetermined size. If the detection turns out to be impossible, LED 100 is turned on to indicate "Non-detectable" in Step 48; otherwise, the document size is determined based on the detected edge thereof in Step 49.

In the second method, in contrast, the appropriate reference data is selected prior to the scanning. Thus, whether LED 102 is manually turned on or not is detected in Step 51. If not, the reference data $Q_1$ is provided to the comparator 62 in Step 52, and the reference data $Q_2$ is provided in Step 53. Subsequently, whether the print key 70 is turned on or not is detected in Step 54. If not, it returns to the sub-routine of either APS mode or AMS mode; otherwise, the document on the document table 11 is scanned with the scanner 13 to detect the edge of the document area in Step 55 followed by Step 56 wherein whether the size of the document is detectable or not is detected. If the detection turns out to be impossible, the LED 100 is turned on to indicate "Non-detectable" in Step 57; otherwise, the document size is determined based on the detected edge in Step 58.

As previously mentioned, the adequate reference data is provided prior to the scanning. Therefore, it does not make any difference whether the edge of the document area is detected when the scanner 13 moves forwards or backwards.

As has been described above, accuracy in detecting the document size can be ensured by selecting either manually or automatically whichever of the reference data $Q_1$ and $Q_2$ is adequate based on the background color of the document. In particular, this method is effective when the CCD device employed in the copying machine is not designed for color images reading.

(Second Embodiment)

Figure 14:
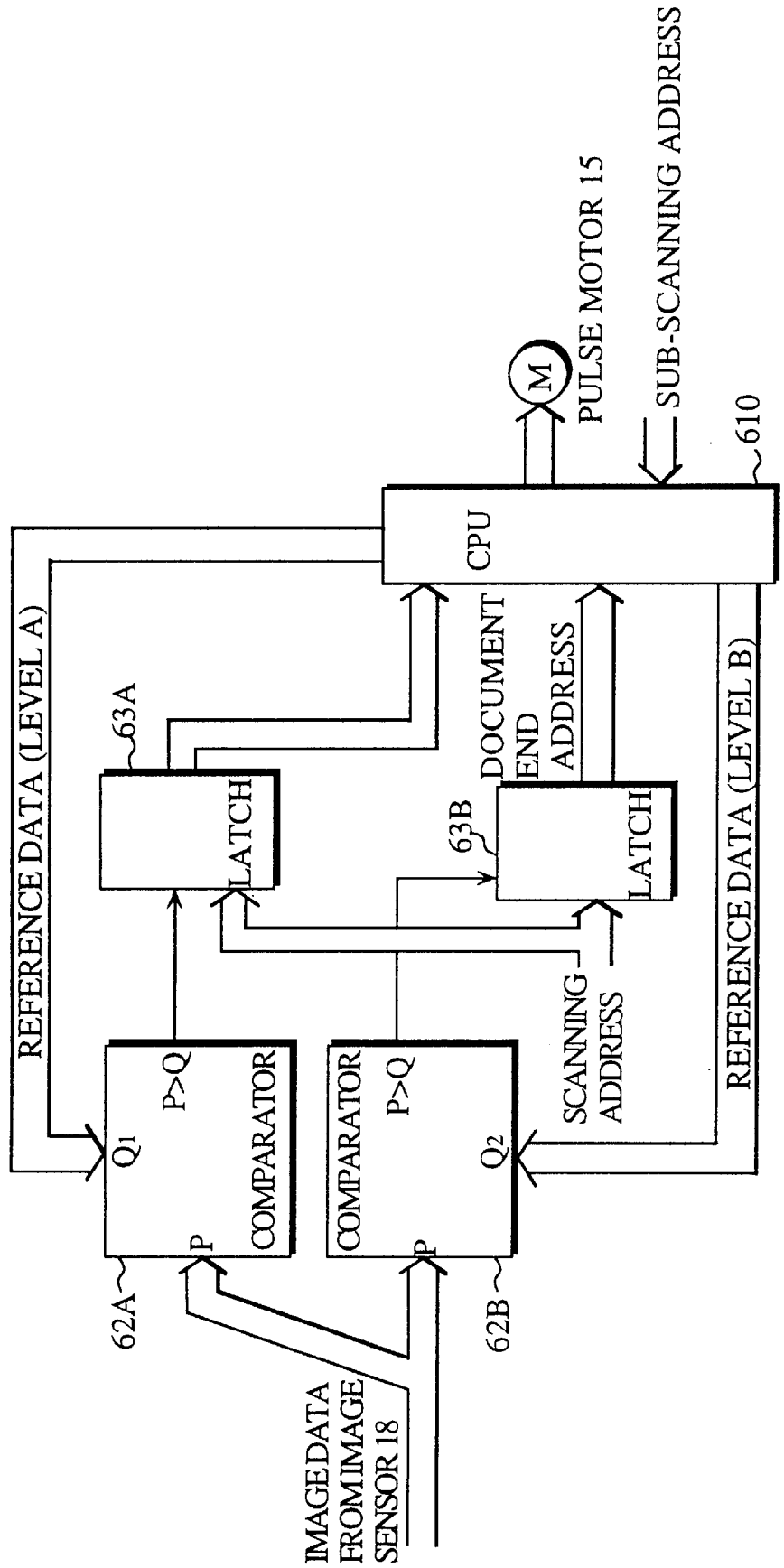
FIG. 14 is a block diagram of CPU 610 and the associated devices.

The copying machine in accordance with this embodiment is controlled by CPU 610 together with comparators 62A and 62B, and latch circuits 63A and 63B as is shown in FIG. 14.

In this embodiment, CPU 610 inputs the reference data $Q_1$ and $Q_2$ respectively into the comparators 62A and 62B synchronously with the input of the image data P from the image scanner 18, so that each of them compares the inputted data to respectively output P>Q to the latch circuits 63A and 63B, whereby the scanning addresses are latched to be sent to CPU 610.

CPU 610 operates in the same manner as was explained with referring to FIG. 8, and an appropriate mode is selected as was explained in FIG. 9. However, the fact that the image data are compared with both the reference data $Q_1$ and $Q_2$ simultaneously makes it unnecessary to detect whether the document to be read is monochrome or not herein.

In the sub-routine of APS mode detailed by a flowchart in FIG. 15-A, the document size is detected in Step 61, a magnification ratio is detected in Step 62, and an appropriate cassette is selected in Step 63.

Likewise, in the sub-routine of AMS mode detailed by a flowchart in FIG. 15-B, the document size is detected in Step 71, a selected copy sheet size is detected in Step 72, and an appropriate magnification ratio is selected in Step 73.

Figure 16:
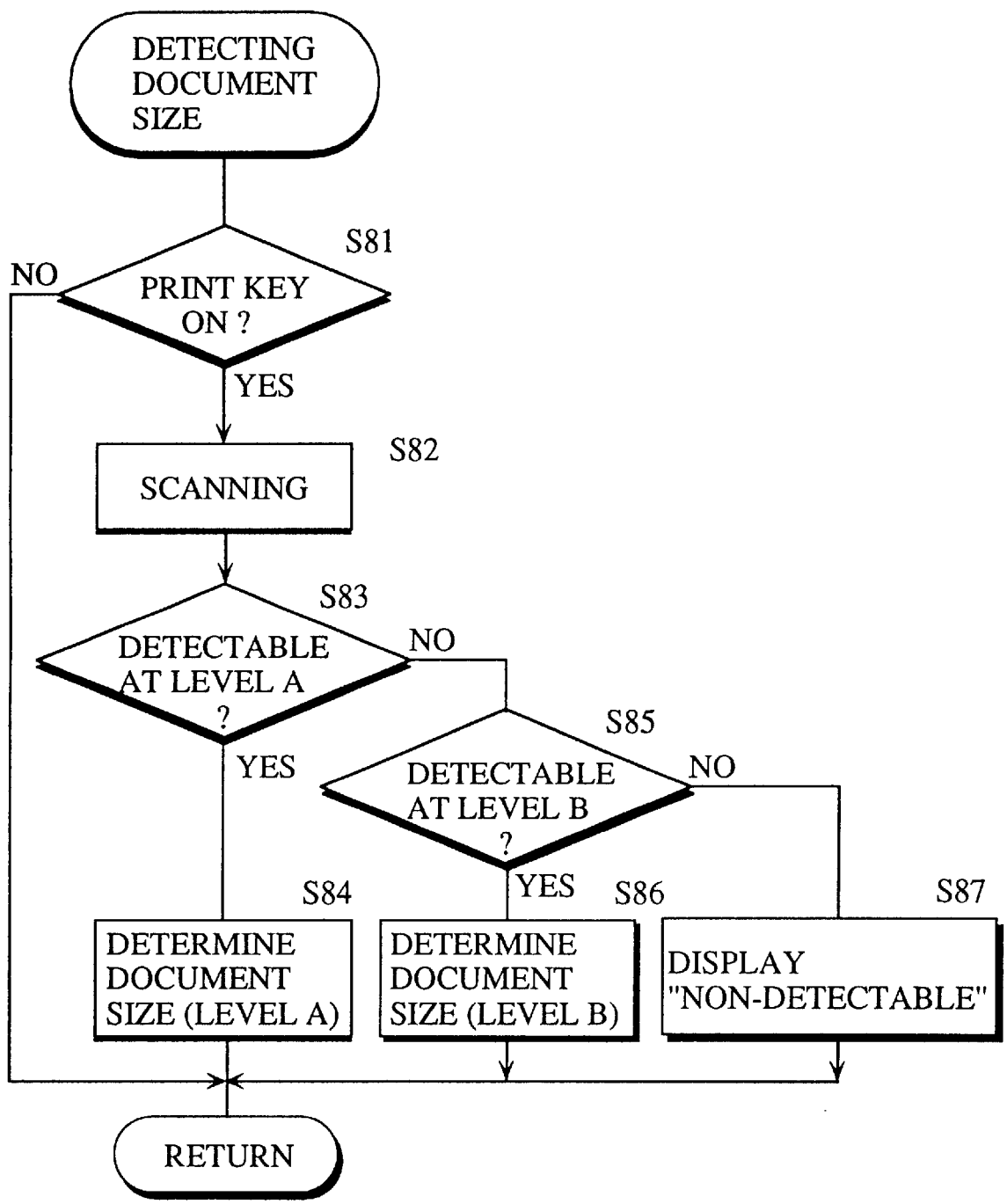
FIG. 16 is a flowchart detailing how the document size is detected in the second embodiment.

A flowchart in FIG. 16 explains how the document size is detected in both the Steps 61 and 71.

In Step 81, whether the print key 70 is turned on or not is detected, and if not, it returns to the sub-routine of either APS mode or AMS mode; otherwise, the document on the document table 11 is scanned by moving the scanner 13 either forwards or backwards in Step 82. Subsequently, whether or not the document size is detectable with the edge of the document area found with the use of the reference data $Q_1$ is detected in Step 83. If it is detectable, the document size is determined based on the detected edge in Step 84; otherwise, whether or not the document size is detectable with the edge of the document found with the use of the reference data $Q_2$ is detected in Step 85 and if detectable, the document size is determined based on the detected edge in Step 86. When the detection turns out to be impossible both in Steps 83 and 85, LED 100 is turned on to indicate "Non-detectable" in Step 87.

Figure 17:
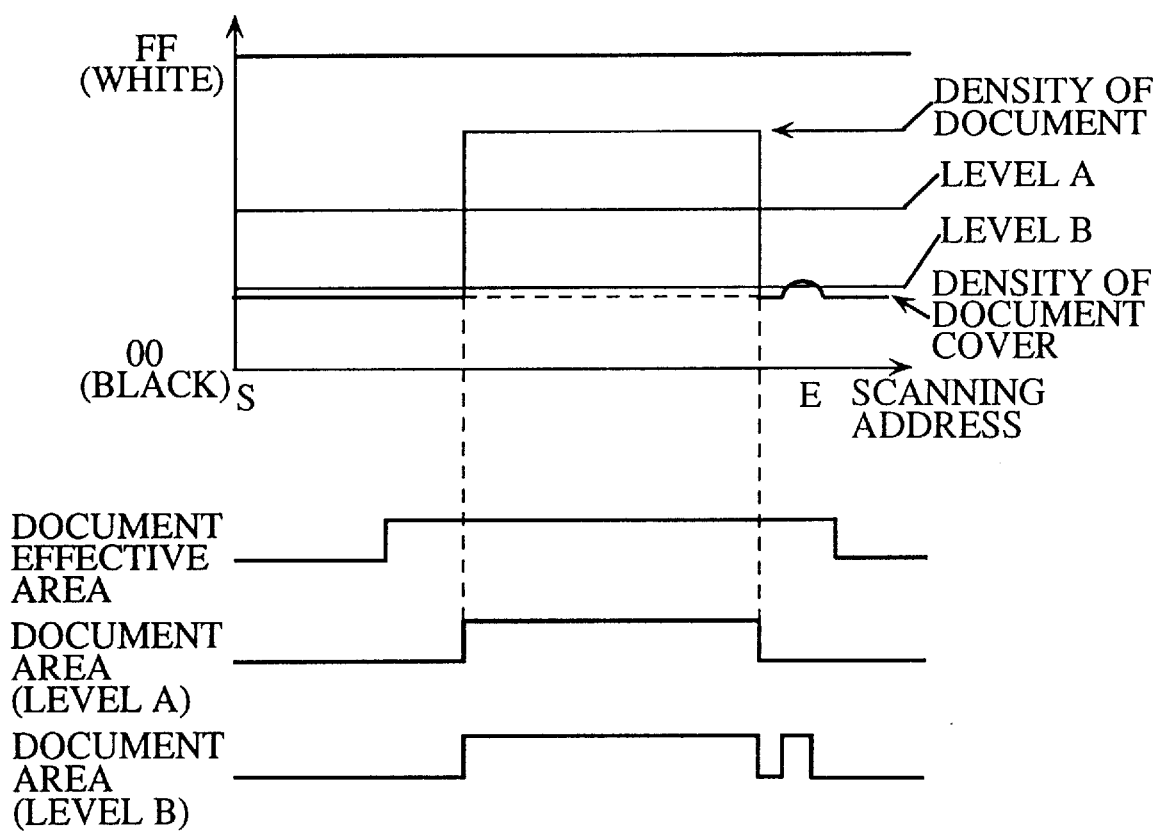
FIG. 17 is a timing chart for detecting the document size of the monochrome document in the second embodiment.

FIG. 17 is a timing chart for detecting the size of the monochrome document. With the reference data $Q_1$ having a sufficient margin both from the highest and lowest levels, there is hardly any error in detecting the document size even when the image data from the image sensor 18 varies within a decent range.

FIG. 18 is a timing chart for detecting the size of the color document. Although the document size can not be detected with the reference data $Q_1$, the reference data $Q_2$ at a lower level enables the size detection as well.

Therefore, accuracy in detecting the document size can be ensured by comparing the image data with both the 2 reference data: even when the document size can not be detected with the reference data $Q_1$, it can be detected with the other reference data $Q_2$.

A table in FIG. 19 shows the correlation between the detected document sizes with both the reference data $Q_1$ and $Q_2$ and the determined document size. In the table, A4W denotes an A-4 copy sheet (297×210 mm) fed in widthwise and A3L denotes an A-3 copy sheet fed in lengthwise, a mark "--" denotes "Non-detectable". It can be understood that when the document sizes detected with the 2 reference data differ, CPU 610 is designed to select the one detected with the reference data $Q_1$ preferentially.

(Third Embodiment)

The copying machine in accordance with this embodiment is controlled by CPU 6100 together with comparators 62A and 62B, a latch circuit 63, and a selector 64 for inputting the image data from the image scanner 18 alternately into the comparators 62A and 62B as is shown in FIG. 20.

CPU 6100 outputs a control signal to the selector 64 every given number of scanning lines (practically ten) based on the sub-scanning address, so that image data are inputted into the comparator 62A and 62B alternately. Although ten scanning lines are sufficient to detect a document of any JIS size, up to approximately 20 scanning lines may be used for further accuracy improvement, or for convenience's sake, the selector 64 may switch every scan line. Since the image data are compared with both the reference data $Q_1$ and $Q_2$ alternately, there is no need to detect whether the document to be read is monochrome or not herein as was in the second embodiment.

Figure 21:
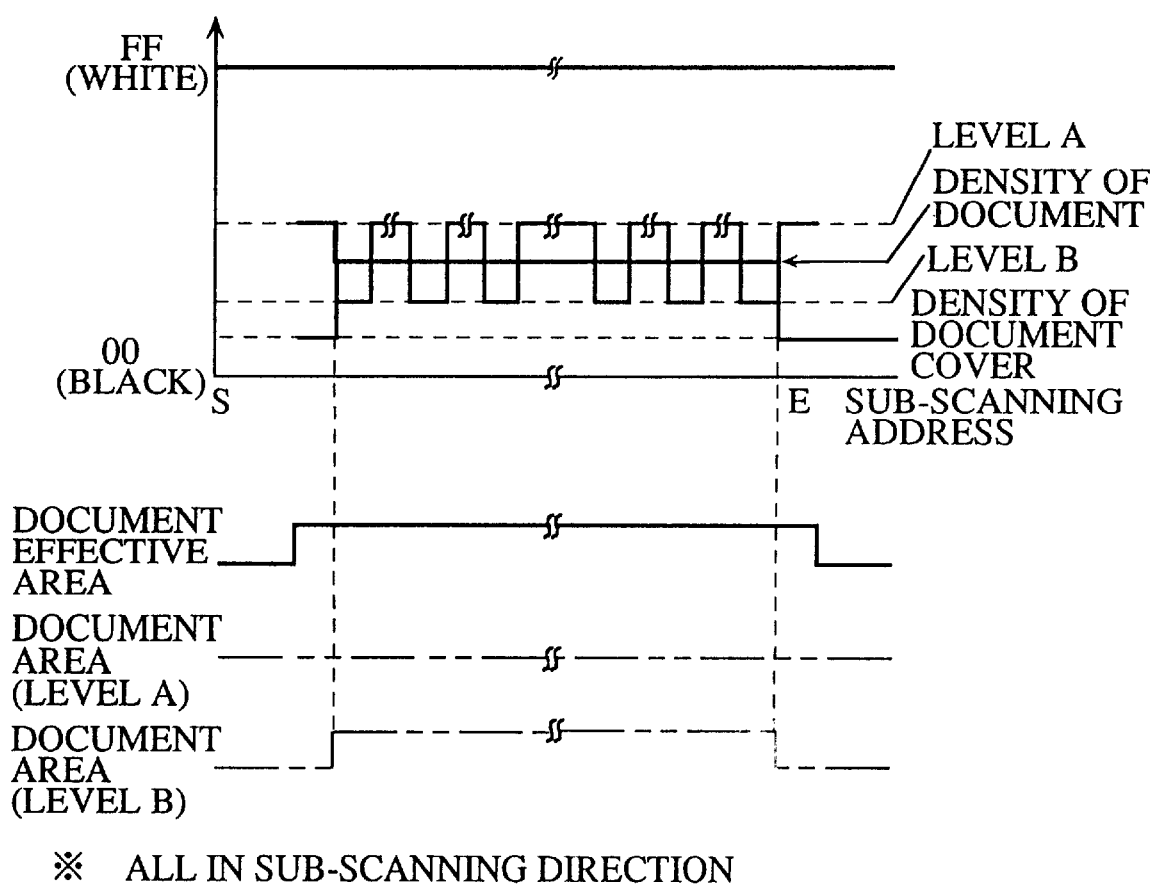
FIG. 21 is a timing chart for detecting the size of the color document in the third embodiment.

FIG. 21 is a timing chart for detecting the size of the color document. Although the document size can not be detected with the reference data $Q_1$, the reference data $Q_2$ at a lower level enables the document size detection.

As has been explained, with the two reference data at different levels being alternately provided, the accuracy in detecting the document size can be enhanced regardless of the background color of the document.

In all the three embodiments, the amount of the reflected light is measured by driving the scanner 13; however, it can be measured by a plurality of photo-sensors fixedly installed in the copying machine.

The document size is detected by finding the address of the image data read by the image sensor 18, it may be driven relatively to the document table. Also, the document area can be distinguished with another type of image sensor that specifies the address of the image data by outputting a value larger or smaller than a predetermined threshold. In addition, more than two reference data can be provided to the comparator 62 to further improve accuracy.

Although the present invention has been fully described by way of example with reference to the accompanying drawings, it is to be noted that various changes and modification will be apparent to those skilled in the art. Therefore, unless such changes and modifications otherwise depart from the scope of the present invention, they should be construed as being included therein.

What is claimed is:

1. A document size detecting device employed in an image forming apparatus for detecting a size of a document placed on a document table and covered over with a document cover based on an amount of light reflected from a document area, comprising:

a photosensor which detects an amount of light reflected from a predetermined location of an area covered with the document cover;

a first detector which detects a kind of the document;

a second detector which detects whether the document is within said predetermined location by comparing an output value from said photosensor with a first threshold;

a third detector which detects whether the document is within said predetermined location by comparing an output value from said photosensor with a second threshold different from said first threshold; and a controller which selects one of said second detector and said third detector based on a kind of the document detected by said first detector and which judges a size of the document based on a detection result of said selected detector.

2. A document size detecting device of claim 1, wherein said photosensor detects a color element of the document; and said first detector detects the kind of the document placed on the document table based on said detected color element.

3. A document size detecting device of claim 2, wherein said first threshold is used to detect a size of a monochrome document and is found by averaging a value for a white portion and a value for a black portion, and said second threshold is used to detect a size of a color document and has a smaller value than said first threshold.

4. A document size detecting device of claim 2 and further including a scanner which reciprocates said photosensor with respect to said document table, and wherein said photosensor detects the color element of the document when said photosensor moves forward with respect to said document table and detects placement of the document on the document table when said photosensor moves backward with respect to said document table.

5. A document size detecting device employed in an image forming apparatus for detecting a size of a document placed on a document table and covered over with a document cover based on an amount of light reflected from a document area, comprising:

a photosensor which detects an amount of light reflected from a predetermined location of an area covered with the document cover;

a detector which detects whether a document is within said predetermined location by comparing an output value from said photosensor with a selected one of a plurality of thresholds, said selected one of said plurality of thresholds being selected based on a kind of the document placed on said document table; and a controller which judges the size of the document based on a detection result of said detector with said selected threshold.

6. A document size detecting device of claim 5, wherein said photosensor detects a color element of the document, and said selected threshold is selected in accordance with said detected color element.

7. A document size detecting device employed in an image forming apparatus for detecting a size of a document placed on a document table and covered over with a document cover based on an amount of light from a document area, comprising:

a photo image sensor which generates image data based on light reflected from a predetermined location of an area covered with the document cover;

a first detector which detects a kind of the document;

a pixel determining device which determines a pixel in the document area by comparing image data of the document from said image sensor with one of a first threshold and a second threshold;

a controller which judges a document size by finding a boundary of the document area through confirming a certain number of successive pixels within said document area by said pixel determining device; and a switching device which selectively switches from said first threshold to said second threshold and from said second threshold to said first threshold based on a kind of the document detected by said first detector.

8. A document size detecting device employed in an image forming apparatus for detecting a size of a document placed on a document table and covered over with a document cover based on an amount of light from a document area, comprising:

a photo image sensor which generates image data based on light reflected from a predetermined location of an area covered with the document cover;

a threshold setting device for setting a first threshold and a second threshold, each being used for a different amount of the reflected light;

a pixel determining device for determining a pixel in the document area by comparing image data of the document from said image sensor with one of said first threshold and said second threshold;

a document size detector which detects a document size by finding a boundary of the document area through confirming a certain number of successive pixels within said document area by said pixel determining device; and a switching device which selectively switches from said first threshold to said second threshold and from said second threshold to said first threshold, wherein said switching device switches alternately between said first threshold and said second threshold every time a certain number of scanning lines in a scanning direction are completed by said image sensor.

9. A document size detecting device employed in an image forming apparatus for detecting a size of a document placed on a document table based on an amount of reflected light, comprising:

a first detector which detects an amount of light reflected from a predetermined location of said document table;

a comparing device which compares an output value from said first detector with a threshold level in accordance with a detection result of said first detector;

a changing device which changes the value of the threshold level based on a kind of the document placed on said document table; and a document size detector which detects a size of the document based on detection results of said comparing device.

* * * * *